(12) United States Patent
Reial et al.

(10) Patent No.: US 11,051,214 B2
(45) Date of Patent: Jun. 29, 2021

(54) METHODS AND ARRANGEMENTS FOR MEASUREMENT BASED MOBILITY

(71) Applicant: Telefonaktiebolaget LM Ericsson (publ), Stockholm (SE)

(72) Inventors: Andres Reial, Malmö (SE); Rui Fan, Beijing (CN); Qingyu Miao, Beijing (CN); Edgar Ramos, Kirkkonummi (FI); Johan Rune, Lidingö (SE); Claes Tidestav, Bålsta (SE); Zhang Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 15 days.

(21) Appl. No.: 16/333,463

(22) PCT Filed: Sep. 30, 2016

(86) PCT No.: PCT/CN2016/101049
§ 371 (c)(1),
(2) Date: Mar. 14, 2019

(87) PCT Pub. No.: WO2018/058512
PCT Pub. Date: May 4, 2018

(65) Prior Publication Data
US 2019/0215737 A1    Jul. 11, 2019

(51) Int. Cl.
*H04W 36/00*    (2009.01)
*H04W 36/08*    (2009.01)
*H04W 36/30*    (2009.01)

(52) U.S. Cl.
CPC ... *H04W 36/0058* (2018.08); *H04W 36/0033* (2013.01); *H04W 36/08* (2013.01); *H04W 36/30* (2013.01)

(58) Field of Classification Search
CPC . H04W 36/00; H04W 36/0094; H04W 36/08; H04W 36/32; H04W 74/0833
See application file for complete search history.

(56) References Cited

U.S. PATENT DOCUMENTS 5,661,724 A * 8/1997 Chennakeshu .... H04B 7/18534
370/324
9,025,564 B2 5/2015 Kim et al.
(Continued)

FOREIGN PATENT DOCUMENTS

CN    1878374 A    12/2006
CN    101617545 A    12/2009
(Continued)

OTHER PUBLICATIONS

Ericsson, "W1 design for implicit advanced CSI reporting", 3GPP TSG-RAN WG1#86, Gothenburg, Sweden, Aug. 22, 2016, pp. 1-6, R1-167645, 3GPP.
(Continued)

*Primary Examiner* — Mansour Oveissi
*Assistant Examiner* — David M Oveissi
(74) *Attorney, Agent, or Firm* — Coats & Bennett, PLLC (57) ABSTRACT

The present disclosure relates to methods and arrangements for performing wireless device assisted handover form a source access node to a target access node. Performed in a wireless device, a method comprises performing (S31) one or more mobility measurements for corresponding candidate radio links and selecting (S32), from the one or more candidate radio links, an initial target link based on the performed one or more mobility measurements. A first radio link measurement report based on the one or more mobility measurements, identifying the initial target link is transmitted (S33) to a target node providing the initial target link, using a first radio link reporting mechanism. A second radio link measurement report for the one or more candidate radio
(Continued)

links and based on the same one or more mobility measurements, is transmitted (S34) to the source access node using a second radio link measurement report different from the first radio link reporting mechanism. Finally, a wireless device connection is initiated (S35) over a handover target link indicated in a handover command from the source access node or over the initial target link, wherein the wireless device connection is initiated over the initial target link based on a reception status for the handover command.

6 Claims, 6 Drawing Sheets

(56) References Cited

U.S. PATENT DOCUMENTS

| | | | |
|---|---|---|---|
| 9,439,206 | B2 | 9/2016 | Hofmann et al. |
| 10,327,183 | B2 | 6/2019 | Reial et al. |
| 2007/0032237 | A1 | 2/2007 | Chang et al. |
| 2008/0020770 | A1 | 1/2008 | Hofmann |
| 2009/0117896 | A1 | 5/2009 | Baldemair et al. |
| 2009/0168718 | A1 | 7/2009 | Wang et al. |
| 2009/0175179 | A1* | 7/2009 | Stewart ............... H04L 27/2647 370/252 |
| 2009/0268707 | A1 | 10/2009 | Pani et al. |
| 2010/0279679 | A1 | 11/2010 | Young et al. |
| 2013/0201913 | A1 | 8/2013 | Niemela |
| 2014/0080484 | A1 | 3/2014 | Centonza et al. |
| 2015/0031379 | A1 | 1/2015 | Zhi et al. |
| 2015/0078325 | A1 | 3/2015 | Kishiyama et al. |
| 2015/0092582 | A1 | 4/2015 | Liao et al. |
| 2015/0382258 | A1 | 12/2015 | Schmidt et al. |
| 2016/0029333 | A1 | 1/2016 | Seo et al. |
| 2016/0037425 | A1 | 2/2016 | Van Lieshout et al. |
| 2016/0150435 | A1 | 5/2016 | Baek et al. |
| 2016/0345216 | A1 | 11/2016 | Kishiyama et al. |
| 2016/0381610 | A1 | 12/2016 | Pu et al. |
| 2017/0215117 | A1 | 7/2017 | Kwon et al. |
| 2017/0366992 | A1* | 12/2017 | Rune .................... H04W 24/08 |
| 2019/0200320 | A1 | 6/2019 | Selvaganapathy et al. |
| 2019/0230536 | A1 | 7/2019 | Da Silva et al. |
| 2019/0261230 | A1 | 8/2019 | Reial et al. |
| 2019/0281509 | A1 | 9/2019 | Tidestav et al. |

FOREIGN PATENT DOCUMENTS

| | | |
|---|---|---|
| CN | 102223664 A | 10/2011 |
| CN | 102281577 A | 12/2011 |
| CN | 102369760 A | 3/2012 |
| CN | 102711167 A | 10/2012 |
| CN | 102932835 A | 2/2013 |
| CN | 103220048 A | 7/2013 |
| CN | 103329593 A | 9/2013 |
| CN | 103428758 A | 12/2013 |
| CN | 104469873 A | 3/2015 |
| CN | 104488317 A | 4/2015 |
| CN | 105144614 A | 12/2015 |
| CN | 105228200 A | 1/2016 |
| EP | 2568739 A2 | 3/2013 |
| EP | 2747474 A | 6/2014 |
| WO | 2010148536 A1 | 12/2010 |
| WO | 2014164144 A1 | 10/2014 |
| WO | 2015164712 A1 | 10/2015 |
| WO | 2016014203 A1 | 1/2016 |
| WO | 2016053426 A1 | 4/2016 |
| WO | 2016129957 A1 | 8/2016 |
| WO | 2016198123 A1 | 12/2016 |
| WO | 2018053748 A1 | 3/2018 |
| WO | 2018058513 A1 | 4/2018 |
| WO | 2018058514 A1 | 4/2018 |
| WO | 2018058515 A1 | 4/2018 |

OTHER PUBLICATIONS

Intel Corporation, et al., "Wf on beam management", Agenda item: 8.1.5, 3GPP TSG RAN1 #86, Gothenburg, Sweden, Aug. 22, 2016, pp. 1-2, R1-168119, 3GPP.

3RD Generation Partnership Project, "3rd Generation Partnership Project; Technical Specification Group Radio Access Network; Physical layer; Measurements (FDD) (Release 13)", Technical Specification, 3GPP TS 25.215 V13.0.0, Dec. 1, 2015, pp. 1-25, 3GPP.

Ericsson, "Mobility Measurements and Procedures", 3GPP TSG-RAN WG2 #94, Nanjing, P.R. China, May 23, 2016, pp. 1-5, R2-164001, 3GPP.

ZTE Corporation, Performance Analysis on Early HO Preparation and Early HO CMD, 3GPP TSG-RAN WG2 Meeting #83, Barcelona, Spain, 19th, Aug. 23, Aug. 2013, R2-132375.

* cited by examiner

METHODS AND ARRANGEMENTS FOR MEASUREMENT BASED MOBILITY

TECHNICAL FIELD

The present disclosure relates to methods and arrangements for performing wireless device assisted handover from a source access node to a target access node.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink. In order to support high data rates, LTE allows for a system bandwidth of 20 MHz, or up to 100 MHz when carrier aggregation is employed, and LTE will continue to evolve. In parallel to the LTE evolution, a new generation of cellular technology is being developed, a $5^{th}$ generation system, 5G. One of the tasks for 5G is to improve throughput and capacity compared to LTE. This is in part to be achieved by increasing the sampling rate and bandwidth per carrier. 5G is also including use of higher carrier frequencies i.e., above 6 GHz.

In an UTRAN and an E-UTRAN, a User Equipment, UE, or a wireless device is wirelessly connected to a Radio Base Station, RBS, commonly referred to as a NodeB, NB, in UMTS, and as an evolved NodeB, eNodeB or eNB, in LTE. A Radio Base Station, RBS, access node, AN, or access point, AP, is a general term for a radio network node capable of transmitting radio signals to a UE and receiving signals transmitted by a UE. In Wireless Local Area Network, WLAN, systems the wireless device is also denoted as a Station, STA.

Future communications networks are expected to use advanced antenna systems to a large extent. With such antennas, signals will be transmitted in narrow transmission beams to increase signal strength in some directions, and/or to reduce interference in other directions. The high frequencies and reliance of beamforming makes it challenging to maintain a reliable radio link. A narrow beam can quickly be lost—in particular when combined with poor diffraction properties. Hence, beamforming based high-frequency radio access technologies are more susceptible to sudden changes in link quality or even loss of coverage, which may lead to significant delays and signaling until the wireless device can recover and find coverage again.

In LTE, some downlink reference signals are broadcasted in an always-on manner and over the full bandwidth, regardless of the presence or position of UEs in the system. These signals are called cell specific reference signals, CRS. A user equipment, UE, receiving the reference signal can measure the quality of neighbor cells for mobility purposes. Applying such continuous transmission of reference signals in all individual transmission beams in such a future cellular communications network may consume resources available for data, and generate a lot of interference in neighboring cells. Continuous transmissions also cause high energy consumption in the radio access points.

One option for reporting the measurements, also known as mobility reference signal measurements, from the UE back to the NW is to use RRC signaling. The information is aggregated at the L3 level and long report lengths may be supported that allow conveying information about many detected candidate link identities and their estimated signal strengths or qualities. Upon the reception of these measurement reports the network is capable of taking handover decisions, either to keep the UE in the cell, move it to another cell within the same frequency, another frequency and/or RAT. The link switch decision may then be taken by the NW considering a combination of link quality and network status parameters.

However another option for handling radio link with non-RRC reporting is also being investigated based on physical layer, L1-based, reporting using Uplink Synchronization Sequences, USS, a locally unique signal carrying a synchronization pilot and an identity. Alternatively, the L1-based reporting may use a physical random access channel (PRACH) preamble. The UE may be configured to send the USS to the target to indicate e.g. the best of a set of candidate DL beams through a preconfigured USS sequence. The UE is configured for performing mobility measurements of multiple candidate beams and, upon detecting the strongest beam; it should directly access the node it originates from. This is done by sending an USS whose uplink, UL, resources (Time/Frequency slot, sequence) are associated with the downlink, DL, beam; the association is preconfigured by the network. The receiving AN, e.g. the target AN, reserves UL resources for USS detection ahead of time, which allows the report to be conveyed with minimal latency. Upon receiving a USS report, an AN, e.g. the target AN, may signal in the DL the new serving link to allow sync parameter updates and other possible configuration changes at the UE. This L1-based method is a quicker way to access a target beam in scenarios where the SINR of the serving link can quickly drop due to shadowing and provides for an improvement in terms of robustness and latency, due to the fact that the UE sends the reporting directly to the target while in the RRC-based method the UE needs to send the measurements to the source, wait for a decision from the source and eventually receive an RRC Connection Re-configuration from the serving link which might be under bad radio conditions.

RRC-based measurement reporting allows conveying reliable, rich measurement information from the UE to the network, but often with considerable signaling overhead and potentially high latency. Only using RRC signaling for mobility decisions, as in LTE, may create problems in some scenarios envisioned for the New Radio, NR, in 5G, such as when the UE is using a high gain beamforming in higher frequencies. There, the link quality provided by a beam can drop very quickly due to the aggressive shadowing effect that does not exist in frequencies when LTE is deployed and the narrow coverage of the beam. RRC signaling may therefore be unsuitable in scenarios in beam-formed systems where link quality diminishes rapidly outside the best coverage areas. The alternative approach, based on USS-reporting, may create problems in other scenarios and may entail complexity and resource drawbacks. In USS-based reporting, the UE can convey only a single link report at a time. Consequently, the beam switch or mobility procedure effectively becomes UE-controlled, since the best link detection and reporting from the UE determines the target link. Accordingly, there is a need to improve measurement reporting in support of mobility procedures.

SUMMARY

An object of the present disclosure is to provide solutions which seek to mitigate, alleviate, or eliminate one or more of the above-identified deficiencies in the art and to provide solutions improving signaling efficiency and link continuity during wireless device assisted handover.

This object is obtained by a method, for use in a wireless device, for performing wireless device assisted handover from a source access node to a target access node in a wireless network. The method comprises performing one or more mobility measurements for corresponding one or more candidate radio links and selecting, from the one or more candidate radio links, an initial target link based on the performed one or more mobility measurements. A first radio link measurement report, based on the one or more mobility measurements, identifying the initial target link is transmitted using a first radio link reporting mechanism to a target access node providing the initial target link and a second radio link measurement report, for the one or more candidate radio links and based on the same one or more mobility measurements, is transmitted to the source access node using a second radio link reporting mechanism different from the first radio link reporting mechanism. The method further comprises initiating communication over a handover target link indicated in a handover command from the source access node or over the initial target link, wherein communication is initiated over the initial target link based on a reception status for the handover command.

The disclosed method enables comprehensive mobility measurement reporting whilst offering a back-up solution for link continuity even during rapid loss of a serving link. Thus, the solution provides for link continuity in wireless networks where link quality diminishes rapidly outside a best coverage area, e.g., in high frequency beam-forming system having narrow beam coverage. A significant benefit of the disclosed solution is that no additional signaling of mobility measurements is required.

According to an aspect of the disclosure, the first radio link reporting mechanism is a physical layer radio link reporting mechanism.

According to another aspect of the disclosure, the second radio link reporting mechanism is a radio resource control, RRC, reporting mechanism.

Accordingly, the proposed method combines the advantages of the fast link establishment possible through a back-up physical layer radio link reporting mechanism, e.g., an uplink synchronization signal, USS, based reporting mechanism when a source link is lost before comprehensive reporting or a handover procedure based on this comprehensive reporting is completed.

The above object of the disclosure is also obtained by a computer readable storage medium, having stored thereon a computer program which, when executed in a wireless device, causes the wireless device to execute any of the above mentioned aspects.

Likewise, the object of the disclosure is obtained by a wireless device that is configured for performing wireless device assisted handover from a source access node to a target access node. The wireless device comprises radio circuitry arranged for transmission and reception of radio signals. The wireless device further comprises processing circuitry configured to, using the radio circuitry, cause the wireless device to perform one or more mobility measurements for corresponding one or more candidate radio links and select, from the one or more candidate radio links, an initial target link based on the performed one or more mobility measurements. Using the radio circuitry, the processing circuitry is configured to transmit a first radio link measurement report, based on the one or more mobility measurements, identifying the initial target link using a first radio link reporting mechanism to a target access node providing the initial target link and to transmit a second radio link measurement report, for the one or more candidate radio links and based on the same one or more mobility measurements, to the source access node using a second radio link reporting mechanism different from the first radio link reporting mechanism. The processing circuitry is further configured to initiate communication over a handover target link indicated in a handover command from the source access node or over the initial target link, wherein communication is initiated over the initial target link based on a reception status for the handover command.

The wireless device and the computer program enable the corresponding advantages of those described above in relation to the method performed in a wireless device.

The object to provide solutions improving signaling efficiency and link continuity during wireless device assisted handover is also obtained by a method performed in an access node for performing wireless device assisted handover from a source access node to a target access node. The method comprises receiving first or second radio link measurement reports over corresponding first or second mutually different radio link reporting mechanisms, wherein the first radio link measurement report comprises an initial target link and wherein a handover target link is determined based on the second radio link measurement report; and initiating a handover procedure to the initial target link or the handover target link.

The above mentioned object of the disclosure is also obtained by a computer readable storage medium, having stored thereon a computer program which, when executed in an access node, causes the access node to execute any of the above mentioned method aspects.

Likewise, the object of the disclosure is obtained by an access node that is configured for performing wireless device assisted handover from a source access node to a target access node. The access node comprises radio circuitry arranged for transmission and reception of radio signals, communications circuitry arranged for transmission and reception of inter node communications signals and processing circuitry. The processing circuitry is configured, using the radio circuitry and communications circuitry, to cause the access node to receive first or second radio link measurement reports over corresponding first or second mutually different radio link reporting mechanisms, wherein the first radio link measurement report comprises an initial target and wherein a handover target link is determined based on the second radio link measurement report; and initiate a handover procedure to the initial target link or the handover target link.

The method performed in an access node, the computer program and the network node enable the corresponding advantages of those described above in relation to the method performed in a wireless device.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

BRIEF DESCRIPTION OF THE DRAWINGS

The foregoing will be more readily understood from the following detailed description of example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Aspects of the present disclosure will be described more fully hereinafter with reference to the accompanying drawings. The methods and arrangements disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

It should be noted that the word "comprising" does not necessarily exclude the presence of other elements or steps than those listed. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments.

In some embodiments the term "access node" is used and it can correspond to any type of access node or any network node, which communicates with a UE and/or with another network node. Examples of access nodes are NodeB, base station, multi-standard radio, radio node, eNodeB, network controller, radio network controller, base station controller, relay, donor node controlling relay, base transceiver station, access point, transmission points, transmission nodes, nodes in distributed antenna system, DAS etc.

Within the context of this disclosure, the terms "wireless device" or "wireless terminal" encompass any terminal which is able to communicate wirelessly with an access node of a wireless network, as well as, optionally, with another wireless device, by transmitting and/or receiving wireless signals. Thus, the term "wireless device" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless devices. Hence, whenever a "user equipment" or "UE" is referred to in this disclosure, this should be understood as encompassing any wireless device as defined above.

A downlink reference signal herein refers to a pre-defined signal, which is known to both transmitter and receiver. The downlink reference signal is typically characterized by a certain symbol or symbol sequence (typically a sequence of one or more symbols). The receiver monitors the radio channel for this pre-known symbol and when a match is found the reference signal is detected. The symbol sequence used in a reference signal is herein referred to as a reference signal sequence. As stated above, reference signals are sometimes used to identify some entity, such as individual beams in a beam sweep. If only the reference signal is used for this purpose, each beam in the sweep needs to be assigned to a unique reference signal sequence. A mobility reference signal is a downlink reference signals used in connection with mobility e.g. handover.

In support for higher frequencies in NG communication systems, beamforming is an essential component. Using antenna arrays at access nodes with the number of elements in the hundreds, fairly regular grid-of-beams coverage patterns with tens or hundreds of candidate beams per node may be created. The coverage area of an individual beam from such an array may be small, down to the order of some tens of meters in width. Channel quality degradation outside the current serving beam area may be significant and occur quickly due to the limited coverage area of the beam.

Figure 1:
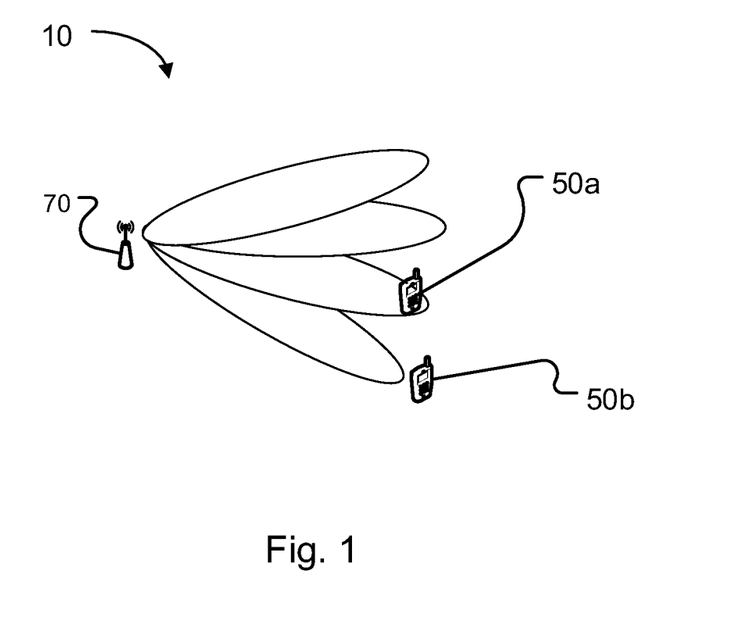
FIG. 1 illustrates a beam sweep transmitted from an access node.

As a consequence, mobility procedures in NG also need to address the problem of finding candidate beams and not only a target AN. Beam sweep procedures are typically employed whereby a beam, i.e., a reference signal used for synchronization and mobility, is sequentially transmitted in a plurality of beam directions from an AN. FIG. 1 illustrates a beam sweep transmitted from an AN having one transmission point. Such a beam sweeping procedure with the purpose of synchronization and beam finding may be performed in conjunction with handover of a wireless device from one beam to another. A handover preparation procedure involving beam sweeping may involve candidate target beams from the wireless device's current serving access node and/or one or more other candidate target access nodes. In 5G systems it is also expected that one single access node might have several transmission points.

Different measurement reporting mechanisms are being investigated for the beam quality reporting: RRC based reporting and a PHY-layer based reporting using Uplink Synchronization Sequences, USS, or physical random access channel, PRACH, preamble, where a UE is configured to send the USS to the target node to indicate e.g. the best of a set of candidate DL beams through a preconfigured USS sequence or PRACH preamble sequence.

In RRC-based reporting, the UE is configured to measure so-called mobility reference signals and, upon the triggering of certain pre-configured events, e.g., serving beam lower than a first threshold while neighbor beam is higher than a second threshold, the UE sends an RRC measurement report message comprising comprehensive, reliable measurement information to a serving source AN, or AN-s, via an established RRC Connection. Based on that, the AN, or more specifically the network function managing mobility, can take educated mobility decisions since the report message will contain radio measurements with respect to multiple candidate nodes or beams associated to a certain UE at certain point in time.

Figure 2:
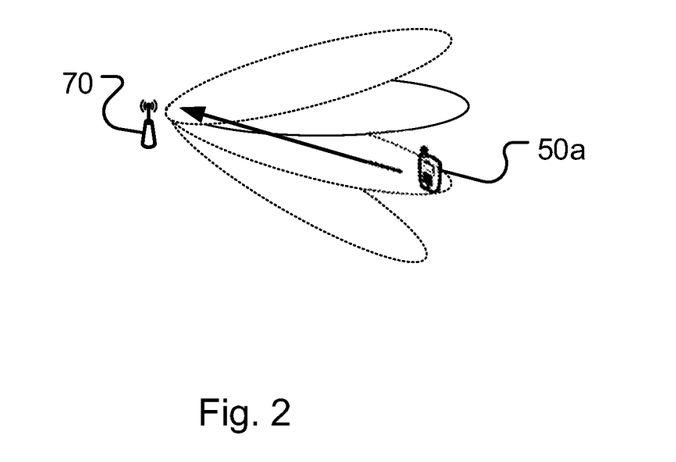
FIG. 2 illustrates a measurement report transmission from the wireless device.

In USS-based reporting the UE is configured to measure mobility reference signals of multiple candidate beams and, to send as a measurement report, an USS whose uplink, UL, resources, e.g., T/F slot and sequence, are associated with the downlink, DL, beam. FIG. 2 illustrates a wireless device reporting one beam of the beam sweep of FIG. 1. This method presents a quicker way to access a target beam in scenarios where the SINR of the serving link can quickly drop due to shadowing, to counteract the propagation challenges in a beam-based system. In terms of robustness and latency, there is an improvement compared to the RRC-based method due to the fact that the UE sends the reporting directly to the target access node, while in the RRC-based method the UE needs to send the measurements to the source access node, wait for a decision from the source and eventually receive a mobility command, e.g., an RRC Connection Re-configuration message, on the serving link which might be under bad radio conditions.

RRC-based measurement reporting allows conveying reliable, rich measurement information from the UE to the network, but often with considerable signaling overhead and potentially high latency. In USS-based reporting, the UE can convey only a single link report at a time. Consequently, the beam switch or mobility procedure effectively becomes UE-controlled and may be less reliable than the RRC-based procedure. Thus, using RRC signaling for mobility decisions entails problems in some NG scenarios, but the alternative approach may also be problematic in other NG scenarios.

This methods and arrangements presented in this disclosure take advantage of the benefits offered by RRC-based reporting and USS-based reporting whilst reducing the associated draw-backs. The idea is to configure a UE to trigger a specific reporting mechanism or combination of reporting mechanisms for mobility related reporting.

As is clear from the above sections, the disclosed solutions are particularly beneficial in wireless networks employing high-gain beamforming, where the candidate links are the different beam configurations that would be used for communication with the wireless device, as illustrated in FIG. 1. However, the principles are also equally applicable to more traditional, cell- and sector-based deployments. Furthermore, in the disclosure, the terms 'links' and 'beams' are used interchangeably and when referring to a beam this represents one example of a link.

Figure 3:
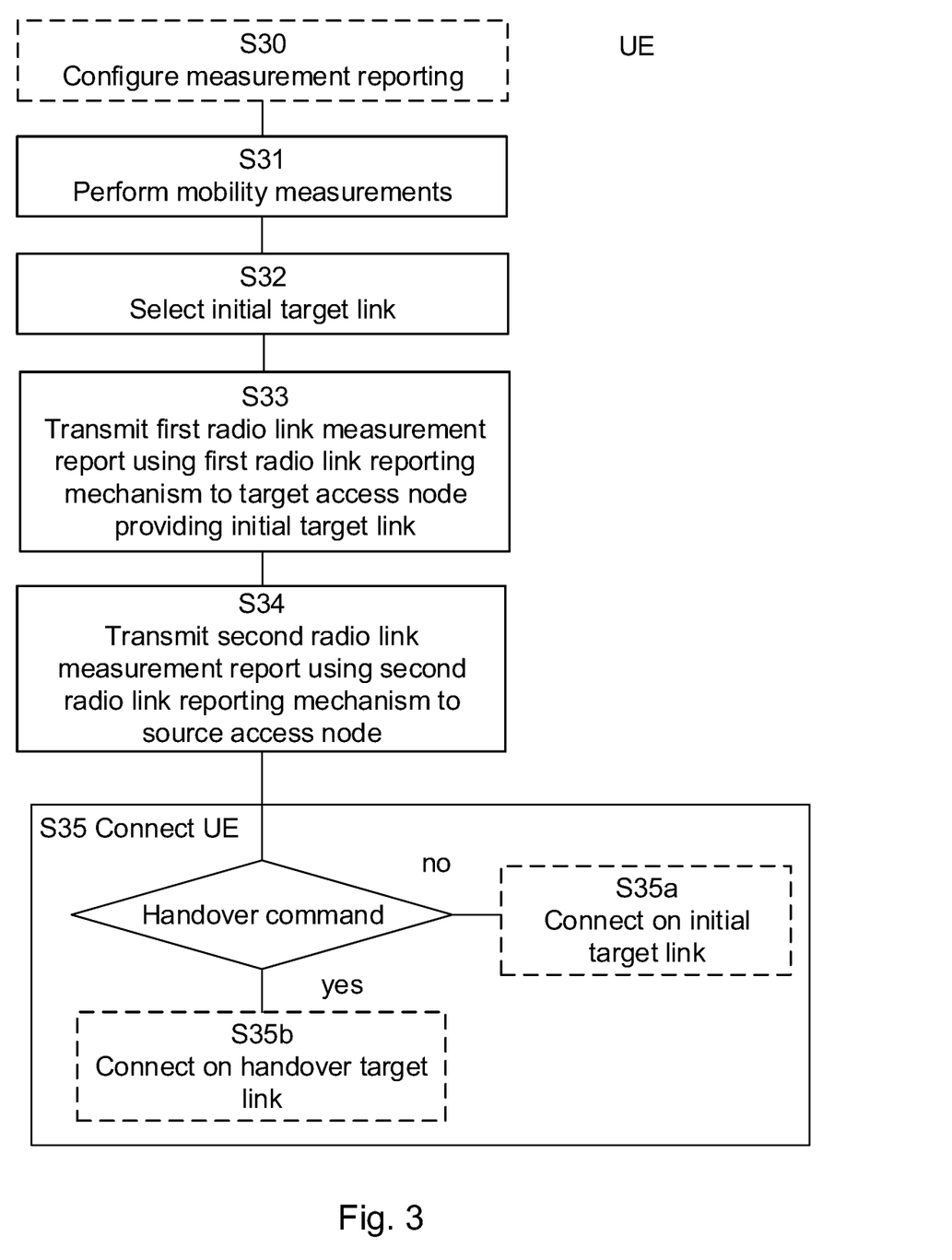
FIG. 3 is a flowchart illustrating exemplary method steps performed in wireless device.

FIG. 3 illustrates, in a flowchart, exemplary method steps performed in a wireless device for performing wireless device assisted handover from a source access node to a target access node. The method comprises to perform S31, in the wireless device, one or more mobility measurements for corresponding one or more candidate radio links. According to an aspect of the disclosure, the performing of one or more mobility measurements comprises measuring suitable downlink signals, e.g., mobility reference signals, MRS, for corresponding candidate radio links. The wireless device is configured for such MRS measurements and reporting, either ahead of time or immediately before the measurements, e.g., through receiving S30 a configuration from a serving access node. The serving access node will in the following be denominated as a source access node, i.e., the access node to which the wireless device is connected when a mobility procedure is initiated. In general, the wireless device measures the mobility reference signals of multiple candidate links, i.e., mobility measurements for corresponding candidate links. According to an aspect of the disclosure, the wireless device derives downlink, DL, synchronization settings from the downlink reference signals and stores these DL synchronization settings for the candidate radio links, i.e., with respect to all detected candidate links. The mobility reference signals may consist of synchronization sequences to obtain time and frequency (T/F) alignment with respect to candidate link signals and link identification sequences to distinguish the different detected candidate link identities. The mobility reference signals may be used to trigger measurement reports. Usually, the triggering conditions are set so that the wireless device sends a report when a candidate link is deemed better than the currently serving link.

Using the result of the mobility measurements for the candidate links, the wireless device selects S32, from the one or more candidate radio links, an initial target link based on the performed one or more mobility measurements, e.g., by detecting and selecting the best-quality link being equivalent to the strongest beam. The wireless device transmits S33 a first radio link measurement report, based on the one or more mobility measurements, identifying the initial target link using a first radio link reporting mechanism to a target access node providing the initial target link. The target access node providing the initial target link is one recipient of the first radio link measurement report, but according to aspects of the disclosure the report may also be transmitted to, or perceived/received by, further target access nodes in the wireless communication system and also to the serving access node also known as source access node. According to an aspect of the disclosure, the first radio link reporting mechanism is a physical layer radio link reporting mechanism and the reporting of the initial target link comprises reporting the best-quality link using a fast L1 reporting approach, e.g. by transmitting a USS whose parameters (sequence, T/F resources) map to the best-quality link identity according to a previous configuration. Thus, according to an aspect of the disclosure, an uplink synchronization sequence, USS, provides the physical layer radio reporting mechanism. For the USS based reporting, the wireless device may use a DL timing reference obtained from the best-quality link mobility reference signal, i.e., the initial target link. This allows the associated target access node to estimate the timing advance, TA, for the initial target link and to avoid additional synchronization procedures, which is particularly beneficial if the wireless device controlled handover is invoked due to serving/source link degradation. The wireless device transmits a USS according to the initial target's DL timing and receives a TA command in the DL control channel. The link to the initial target is thus established.

Re-using the mobility measurements performed for the one or more candidate radio links, the wireless device transmits S34 a second radio link measurement report, based on the same one or more mobility measurements, for the one or more candidate radio links, to the source access node using a second radio link reporting mechanism different from the first radio link reporting mechanism. As previously mentioned, the performing of mobility measurement comprises measuring downlink reference signals for corresponding candidate radio links, thus providing a comprehensive set of measurements that may be sent in the second radio link measurement report. According to an aspect of the disclosure, the second radio link reporting mechanism is a radio resource control, RRC, reporting mechanism. Thus, the wireless device also sends an RRC report via the current serving link, to a receiving source access node, providing identity and quality information for several candidate links. While here above presented as being performed following transmission of the first radio link measurement report, the second report may in fact be sent before, after, or in principle simultaneously with the first radio link measurement report.

The wireless device then initiates communication over a handover target link indicated in a handover command from the source access node or over the initial target link, wherein communication is initiated over the initial target link based on a reception status for the handover command. Thus, the wireless device awaits a handover command from the source access node via the serving link. If the command is received, the wireless device performs a handover according to predetermined procedures to a handover target node indicated in the handover command. However, if a handover command is not received, e.g., within a predetermined time from sending the second radio link measurement report, e.g., the RRC report, and the wireless device does not receive any other data and signal from the source access node within a predetermined time, the wireless device then autonomously switches to use the initial target link identified in the first radio link measurement report, i.e., the initial target link that the wireless device itself it reported via the first radio link reporting mechanism. This also applies to the situation where where the UE knows that the RRC measurement report transmission failed, e.g. indicated by Hybrid Automatic Repeat Request, HARQ, NACKs (negative acknowledgements). From a wireless device perspective there is no difference between the case where the RRC report is never received by the source access node, e.g., due to link failure, and a case where a handover command is not received. In either case the wireless device will switch to the target access node and the initial target link selected by the wireless device. In some conventional deployments, a handover command may be ignored if the source access node determines that there is no need for handover. However, in most scenarios, a response message or a handover command is expected in response to the sending of the RRC report.

In the following discussion, an embodiment is used where the first radio link measurement report is provided by means of a USS and the second radio link measurement report is an RRC-report for the sake of simplifying the presentation. However, the present disclosure is not limited to such an embodiment nor should the specific scenarios disclosed below be considered as limited to RRC and USS-based reporting.

According to an aspect of the disclosure, the order between the first radio link measurement report transmission, e.g., the L1 reporting or USS transmission, and the second radio link measurement report transmission e.g., the RRC reporting, may be reversed. By reversing the order, the RRC based procedure, which is more time critical in the sense that it is the procedure that is susceptible to sudden loss of the serving link, is initiated earlier. The RRC report is a dynamically scheduled transmission, whereas the L1 report (USS transmission) has a fixed/predetermined schedule (determined when the wireless device and the candidate ANs are configured for the measurement procedure). Performing the transmissions in reversed order, if the transmission of the RRC report runs into problems, e.g. because the scheduling request or scheduling allocation transmission fails or multiple HARQ retransmissions are required, the wireless device may have to abort the RRC transmission attempt prematurely in order to transmit the USS according to the configured schedule. This issue may be mitigated by having some flexibility in the scheduling of the USS transmission, i.e. configuring a time window rather than a timeslot for the USS transmission. Thus, according to an aspect of the disclosure, the order between the first and the second radio link measurement reports may be configurable whereby the second radio link measurement report could be transmitted prior to transmission of the first radio link measurement report. According to an aspect of the disclosure, the order in which to transmit the first or second radio link measurement report is received in configuration information provided to the wireless device prior to performing the measurement procedure.

As mentioned above, the communication over a handover target link indicated in a handover command from the source access node or over the initial target link is initiated based on a reception status for the handover command. However, it will be understood that a reception status of the handover could also be perceived from the transmission of the RRC report. If the UE does not receive a confirmation of successful reception, e.g. HARQ or RLC, within a predetermined time period, the wireless device will determine that the RRC report transmission has failed and will then have to switch to the initial target link. If the transmission of the RRC report fails, the source access node will not be able to transmit any handover command and consequently the reception status in this particular case will be that the wireless device did not receive a handover command.

The inability to receive a handover command may of course also be the result of link loss following the measurement reporting which will again result in a switch to the initial target link.

Figure 4:
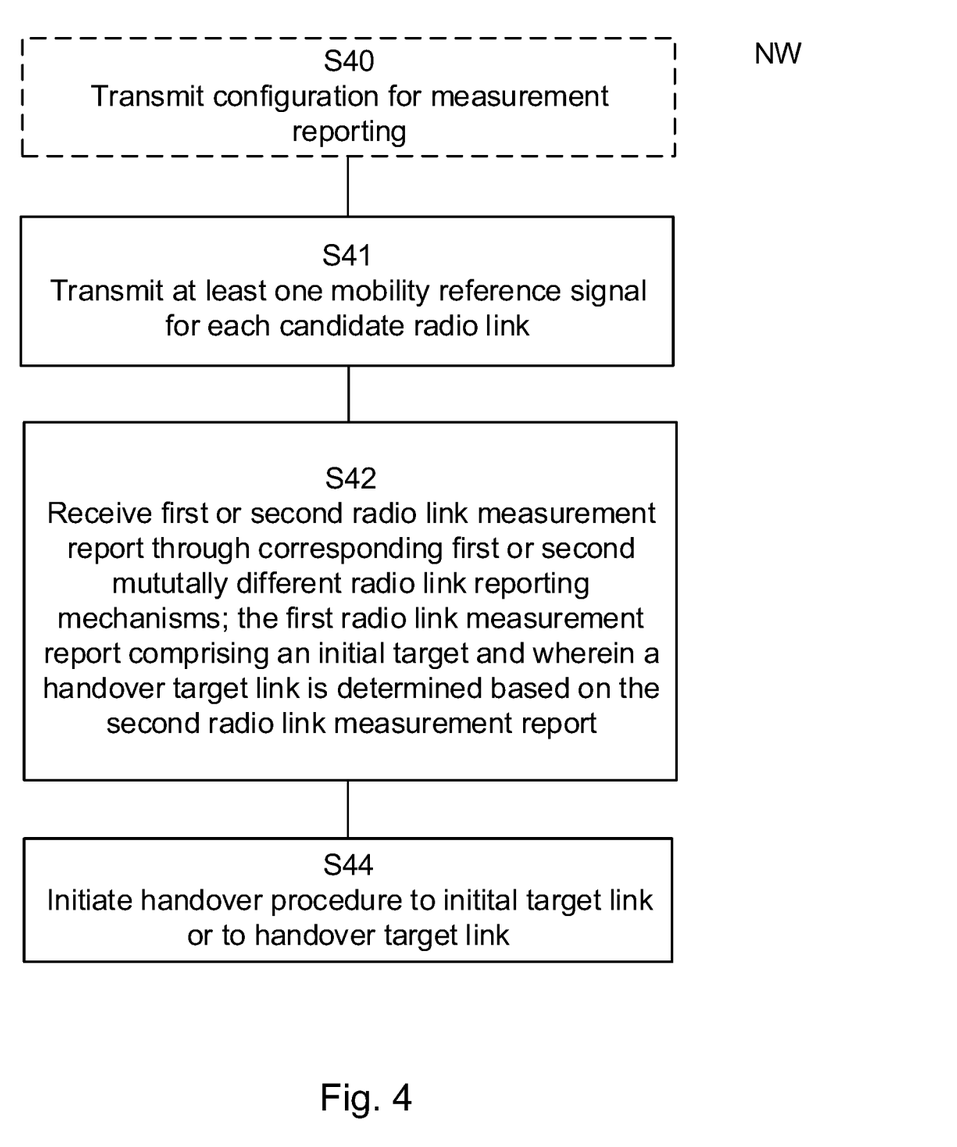
FIG. 4 is a flowchart illustrating network aspects of exemplary method steps;
  a. is a flowchart illustrating exemplary method steps performed in a source access node;
  b. is a flowchart illustrating exemplary method steps performed in a target access node.
Figure 4A:
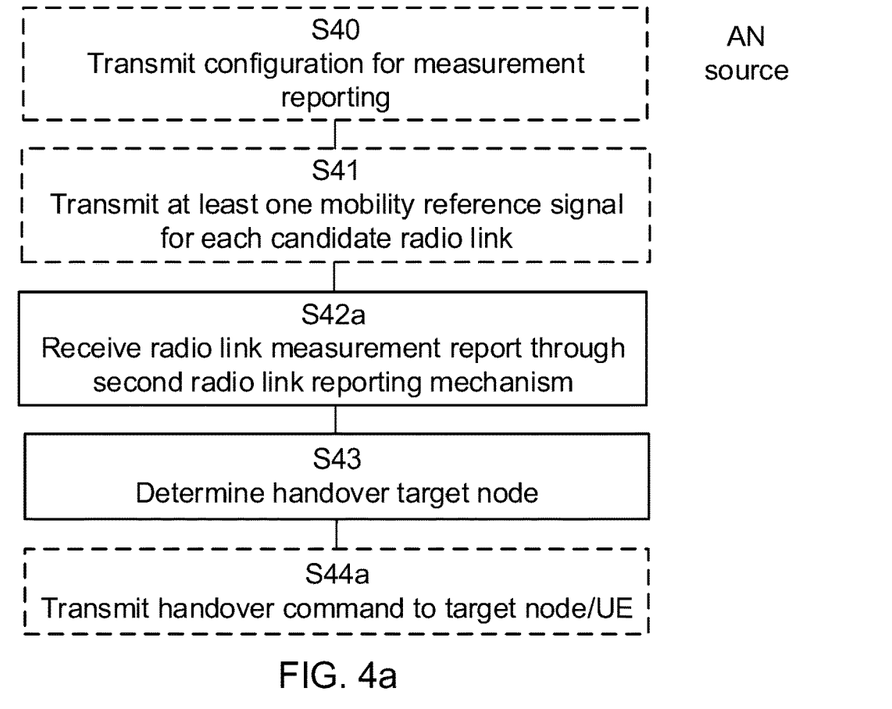
Figure 4B:
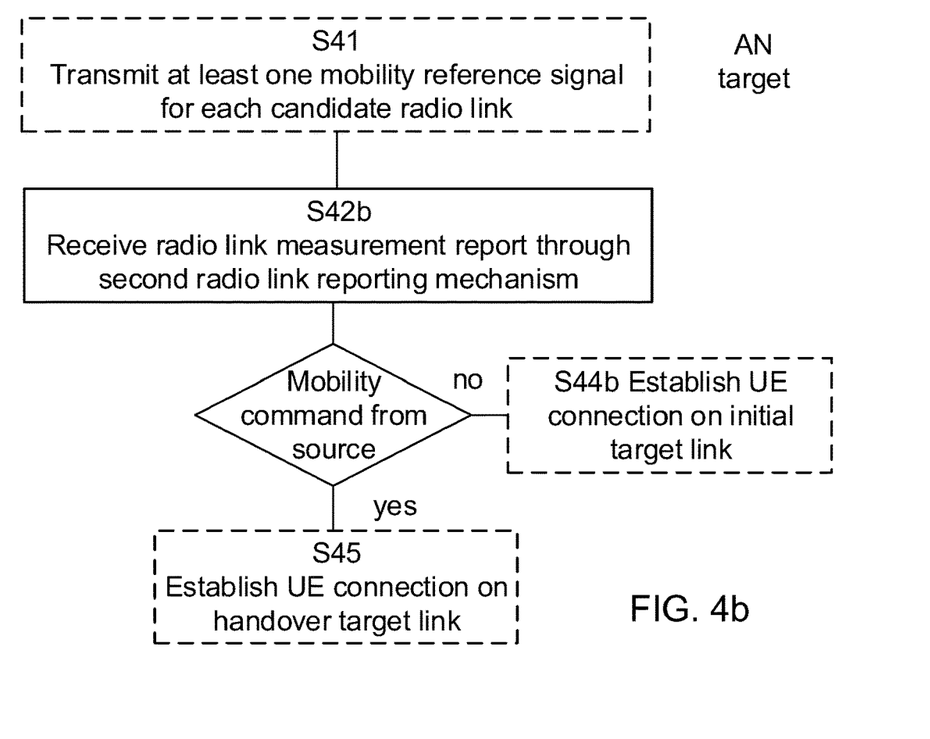

FIG. 4 illustrates, in a flowchart, network aspects of the above discussed method. The disclosed operations are performed in network nodes providing a radio interface to a wireless device, i.e., one or more access nodes representing a source access node and a target access node for a wireless device assisted handover. FIG. 4a and FIG. 4b disclose the exemplary operations from the perspective of a source access node and a target access node. However, the present disclosure is not limited by the exemplary distribution of operations suggested in FIGS. 4a and 4b. In the following, the network perspective will be presented with reference to the operations disclosed in FIGS. 4, 4a and 4b without specific reference to any one Figure.

The method performed in an access node comprises transmitting at least one signal for the purpose of mobility measurements for a corresponding candidate radio link. Turning back to the beam sweep presentation given for FIG. 1, it will be understood that there are usually a number of candidate links provided by each target node. Hence, commonly a plurality of signals would be transmitted to enable mobility measurements for a plurality of candidate links. According to an aspect of the disclosure, the access node transmits S40 a configuration to the wireless device for configuring the wireless device performance of the mobility measurements. The configuration instructions configures the wireless device for performing one or more mobility measurements for corresponding one or more candidate radio links, e.g., to measure and report downlink, DL, mobility reference signal quality in multiple candidate links.

In a network comprising at least a source access node and a target access node, the network, i.e., the access node of the network, transmits S41 multiple mobility reference signals, i.e., downlink reference signals corresponding to each candidate link according to an aspect of the disclosure. The mobility reference signals may be scheduled specifically for the given wireless device measurement session or scheduled as part of a periodic transmission pattern. An alternative to scheduling the candidate MRS transmissions specifically for a given wireless device measurement sessions, is that the mobility reference signal transmissions are repetitive on a permanent or semi-permanent basis and that the wireless device is configured to measure on a certain set of repetitive mobility reference signal transmissions.

According to an aspect of the present disclosure, the mobility reference signals are mapped to uplink synchronization signals, USS, according to predefined rules or through signaling from the network, so that the access nodes transmitting candidate mobility reference signals also have knowledge of the mapping relationship between each MRS and an USS. USS reception resources are reserved in the access node that transmits a mobility reference signal. All access nodes transmitting signals for the purpose of mobility measurements, or a subset that is likely to successfully receive the USS, may be invoked in this process.

Following transmission of one or more signals for the purpose of mobility measurements, e.g., mobility reference signals, the access node receives first or second radio link measurement reports over corresponding first or second mutually different radio link reporting mechanism. The first radio link measurement report comprises an initial target link, while the second radio link measurement report comprises a comprehensive list of candidate link identities detected by the wireless device and their qualities. The access node receiving the second radio link measurement report uses the second radio link measurement report to determine a handover target link, e.g., according to legacy procedures.

According to an aspect of the present disclosure, the first radio link reporting mechanism is a physical radio link reporting mechanism. According to a further aspect of the disclosure, an uplink synchronization signal, USS, provides the physical layer radio link reporting mechanism. The second radio link reporting mechanism is according to aspects of the disclosure a radio resource control, RRC, reporting mechanism.

In the following discussion, an embodiment where the first radio link measurement report is provided by means of a USS and the second radio link measurement report is an RRC-report is used for the sake of simplifying the presentation. However, the present disclosure is not limited to such an embodiment nor should the specific scenarios disclosed below be considered as limited to RRC and USS-based reporting. Furthermore, a target access node providing the initial target link will be presented as a wireless device selected target access node or USS selected target node, while another target access providing the handover target node will be considered as a network selected target node. The handover target node and the initial target node may of course be the same even if the selection processes differ.

Every access node that transmits a mobility reference signal must also be prepared to receive a USS. The allocation of that USS reception slot is determined by the network, and conveyed to the wireless device in a way similar to the allocation of mobility reference signals. Hence, the network reserves USS reception resources in the one or multiple candidate access nodes that transmitted the respective mobility reference signals. For each access node, at least some of the USS reception resources should be located in the time domain after a potential expiration of the above mentioned timer (or after the estimated time of a maximum number of HARQ and possible higher protocol layer retransmission attempts). If the mobility reference signals are repeatedly transmitted, allocated USS resources must also occur repetitively with the same period.

The access node that receives the first radio link measurement report comprising the initial target link is a target access node for the handover procedure. In response to receipt of the initial target link, the target access node initiates a handover procedure and may also send information to the source access node about the initiated handover procedure. The network also attempts to receive a second radio link measurement report, e.g., an RRC report, via the current serving link in the source access node. The RRC report provides a comprehensive list of candidate link identities detected by the wireless device and their link qualities. If the RRC report is received successfully, the receiving access node, i.e., the source access node, determines a handover target link for the wireless device based on the reported candidate link qualities and e.g., the load in the different access nodes associated with these candidate links. The source access node transmits a handover command over the serving (source) link to the wireless device, e.g., at a predetermined time or within a predetermined time window after receiving the RRC report, and thereby initiates a network controlled handover procedure. The network controlled handover procedure is performed according to prior art procedures. Thus, depending on whether the first or the second radio link measurement report is successfully received in the access node, a handover procedure is initiated either to the initial target link or to the handover target link.

According to one aspect of the disclosure, information on the handover target link, i.e., the network selected target link may also be communicated to a target access node following target link establishment based on the first radio link measurement report. The source access node may provide information to the wireless device relating to the handover target node, whereupon a handover procedure is initiated to the handover target link. The wireless device learns the handover target link from the source access node, but the actual handover to the handover target link may be performed using the physical layer reporting mechanism for a fast link establishment. Following initiation of the handover target link based on a handover procedure using signaling in the physical layer, the handover target link may then be reconfigured using RRC. The handover procedure may include receiving uplink, UL, signals from the wireless device to estimate the timing advance, TA, with respect to the target node, inter-AN handover and confirmation messages, data buffer transfers, etc.

In some cases, the source link may not survive long enough to support the full RRC-based handover procedure to a handover access link via the source access node. This may be the case when the wireless device is moving rapidly away from the current narrow beam coverage area or when around-the-corner effects cause sudden shadowing. If the second radio link measurement report, e.g., RRC report, is not received, the source access node will inform the target access node selected by the wireless device that the handover based on the second radio link measurement report is not successful. The network then proceeds with a handover procedure to the initial target link according to the first radio link measurement report, e.g., a best-quality link report, received via USS-based reporting mechanism. As a general principle, if the source access node or the wireless device has sent certain signaling over the source link and does not receive an expected return signaling (message, response, and confirmation), this is an indication of a lost source link and a handover using the USS-based reporting mechanism should be initiated.

If the second radio link measurement report, e.g., the RRC report, is not received in the source access node, the source access node knows that the wireless device will switch to the initial target link and can act accordingly. However, when the source access node has transmitted a handover command which is not acknowledged, then the situation is ambiguous from the source access nodes point of view, since the source access node cannot know whether or not the wireless device actually received the command. Therefore, according to an aspect of the disclosure, the source access node transmits information, e.g., handover and configuration related information, both to a target access node providing the initial target link and to another target access node providing the handover target link determined in the source access node based on the RRC report. Then it is up to the wireless device to determine which access node that actually becomes the target, i.e. if the wireless device received the handover command, it will switch to the network selected target access node, otherwise the wireless device will switch to the USS selected target access node.

In a case where the source access node receives the second radio link measurement report but the subsequent procedure fails, e.g., when a handover command does not reach the wireless device, it is still possible for the wireless device to connect to the target access node selected by the network. The source access node could enable this by transmitting a request to the target access node providing the designated handover target link to transmit a mobility reference signal or other type of signal to enable further mobility measurements. At this point, the target access node selected through the first radio link reporting mechanism will not be transmitting mobility reference signals and the wireless device may synchronize to the handover target link selected by the network by detecting the mobility reference signal.

As mentioned above, from a network or source access node perspective, failure to deliver the handover command is an ambiguous situation, since the source access node cannot know whether or not the wireless device received the handover command. According to an aspect of the disclosure, the network could be prepared for both, i.e. the source access node could inform both the access node selected through wireless device signaling and the access node selected by the source access node that they should be prepared to assume the role as target access node. Then it is up to the wireless device to select which of these access nodes that actually becomes the target, i.e. if the wireless device received the handover command, it will switch to the network selected target access node, otherwise the wireless device will switch to the target access node selected through the first radio link reporting mechanism.

In the case where the wireless device switches to the initial target link, the target access node providing this initial target may proactively inform the source access node that it is a target access node selected to provide an initial target link and query the source access node for information on the handover target link and the target access node providing this handover target link. This would enable a subsequent handover, or redirection, of the wireless device to the handover target link and the target access node selected by the network. An alternative to this proactive approach could be that the source access node also receives the USS transmission from the wireless device and thus knows which candidate access node that the wireless device has selected. Hence, after determining that the RRC report and/or handover command via the serving/source link has failed, the source access node informs the access node selected by the USS that it is a target access node and transfers possible context parameters. If the source AN determines that the RRC report and/or handover command via the serving/source link has failed and the source access node did not receive the USS, then the source access node sends a message to each of the involved candidate access nodes, instructing the USS-selected access node that it should assume the role of target access node and respond to the USS. The selected target AN should preferably confirm this instruction while a non-selected candidate access node may ignore the message or, alternatively, respond negatively (i.e. indicating that it was not selected by the USS). Wireless device context parameters to be transferred from the source access node to the target access node could be included in the first message that a source access node sends to the candidate access nodes (i.e. the message instructing the USS selected access node that it is the target access node) or, alternatively, they could be sent to the target access node in response to a confirmation message.

To rapidly conduct the USS-based, essentially wireless device controlled handover, the network uses the received USS signal for timing advance estimation and relies on the ability of the wireless device to use previous mobility reference signal measurements for DL synch establishment. To avoid deadlock, the source access node prepares both the USS selected access node and the network selected access node to assume the target role, but this does not necessarily involve MRS transmissions. The wireless device is in downlink, DL, sync with the USS-selected AN, so the USS-selected AN can transmit a reconfiguration message (e.g. a RAR or RAR-like message) without a preceding MRS. Any further reconfiguration is then performed via the target node corresponding to the best-quality link reported via L1.

In this case the message (which could be called HO command) which confirms that the target selection indicated by the USS is accepted, including full or partial reconfiguration of the UE (e.g. TA), is sent from the target AN. This message is preferably sent at a predetermined time, or within a predetermined time window, after the end of the predetermined time (or time window) for the handover command from the source AN. This allows the UE to monitor the DL of the serving link of the source AN during the predetermined time or time window for the HO command after sending the RRC report and if this is not successfully received, the UE switches to monitor the DL of the USS selected AN, anticipating response confirming that the USS selected AN/beam is the chosen target and the new serving AN.

Loss of the source link may be checked during the measurement reporting and handover process. Check points may be inserted in the handover sequence to react to failure to receive a handover command or confirmation messages. The failure may be inferred at the network and wireless device sides if an expected response message is not received within a predetermined time period from transmitting a message. At such an instance, the network and the wireless device may revert to using the USS selected initial target link.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed in FIGS. 3, 4, 4a and 4b. The particular sequence of such executable instructions or associated data structures represents examples of corresponding acts for implementing the functions described in such steps or processes.

Figure 5:
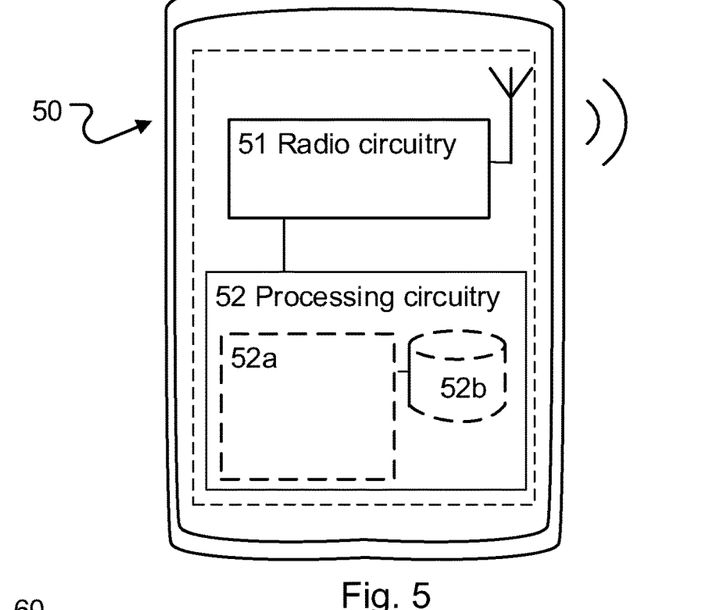
FIG. 5 illustrates an example wireless device configuration.

FIG. 5 is an example configuration of a wireless device, which may incorporate some of the example embodiments discussed above. The wireless device is configured for performing wireless device assisted handover from a source node to a target node. As shown in FIG. 5, the wireless device comprises radio circuitry 51 arranged for transmission and reception of radio signals. It should be appreciated that the radio circuitry 51 may be comprised as any number of transceiving, receiving, and/or transmitting units or circuitry and that the radio circuitry may operate in half-duplex or full duplex transmission mode. It should further be appreciated that the radio circuitry 51 may be in the form of any input/output communications port known in the art.

The wireless device further comprises processing circuitry arranged to control operation of the wireless device. In particular, the processing circuitry 52 is configured to cause the wireless device to perform one or more mobility measurements for corresponding one or more candidate radio links, and to select, from the one or more candidate radio links, an initial target link based on the performed one or more measurements. The processing circuitry 52 also causes the wireless device to select, from the one or more candidate radio links, an initial target link based on the performed one or more mobility measurement. The processing circuitry further causes the wireless device to transmit a first radio link measurement report, based on the one or more mobility measurements, identifying the initial target link using a first radio link reporting mechanism to the target access node, and to transmit a second radio link measurement report for the one or more candidate radio links and based on the same one or more mobility measurements, on the selected target link using a second radio link reporting mechanism different from the first radio link reporting mechanism. Finally, the processing circuitry is configured to cause the wireless device to initiate communication over a handover target link indicated in a handover command from the source access node or over the initial target link, wherein communication is initiated over the initial target link based on a reception status for the handover command.

According to an aspect of the disclosure, the processing circuitry comprises a processor 52a and a memory 52b. The processor 53a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry.

The memory 53b may further be configured to store received or transmitted data and/or executable program instructions. The memory 53b may be any suitable type of computer readable memory and may be of volatile and/or non-volatile type.

Figure 6:
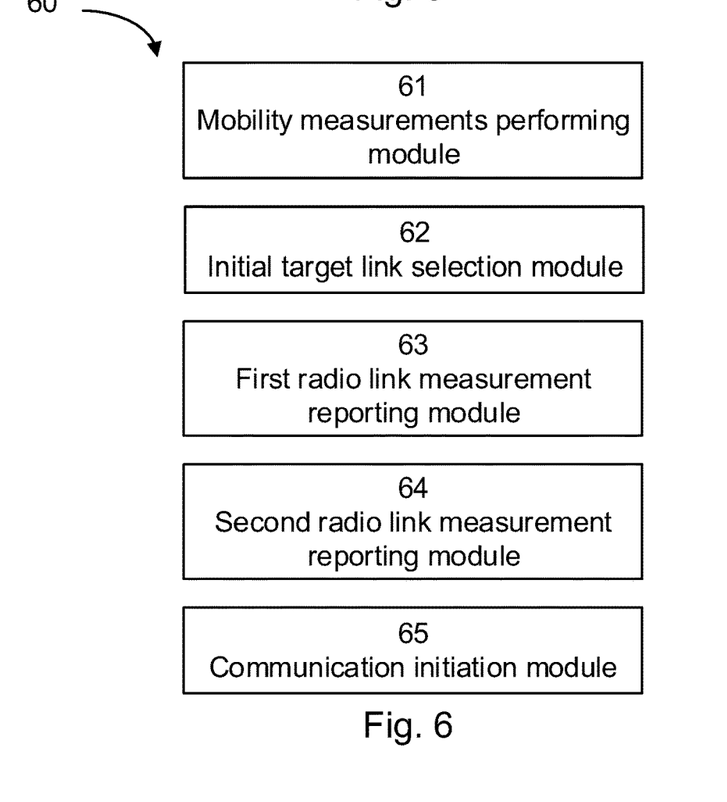
FIG. 6 illustrates an example wireless device configuration.

FIG. 6 illustrates an embodiment of a wireless device 60 configured for performing wireless device assisted handover from a source node to a target node. The wireless device 60 comprises a mobility measurements performing module 61 for performing mobility measurements for corresponding one or more candidate radio links, an initial target link selection module 62 configured to select, from the one or more candidate radio links, an initial target link based on the performed one or more mobility measurements, a first radio link measurement reporting module 63 configured to transmit a first radio link measurement report, based on the one or more mobility measurements, identifying the initial target link using a first radio link reporting mechanism to the source access node, a second radio link measurement reporting module 64 configured to transmit a second radio link measurement report for the one or more candidate radio links and based on the same one or more mobility measurements, using a second radio link reporting mechanism different from the first radio link reporting mechanism and a communication initiation module 65 configured to initiate communication over a handover target link indicated in a handover command from the source access node or over the initial target link, wherein communication is initiated over the initial target link based on a reception status for the handover command.

Figure 7:
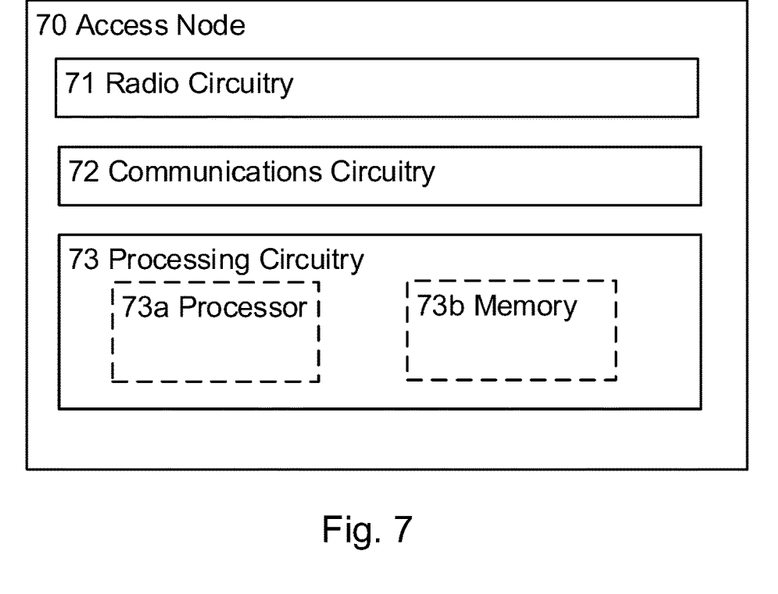
FIG. 7 illustrates an example node configuration for an access node.

FIG. 7 is an example configuration of an access node 70, which may incorporate some of the example embodiments discussed above. The access node 70 is configured for performing wireless device assisted handover from a source node to a target node. As shown in FIG. 7, the access node comprises radio circuitry 71 arranged for transmission and reception of radio signals. It should be appreciated that the radio circuitry 71 may be comprised as any number of transceiving, receiving, and/or transmitting units or circuitry and that the radio circuitry may operate in half-duplex or full duplex transmission mode. It should further be appreciated that the radio circuitry 71 may be in the form of any input/output communications port known in the art.

The access node may further comprise communications circuitry 72 arranged to transmit and/or receive communications signals from one or more further radio network nodes. It should further be appreciated that the communications circuitry 72 may be in the form of any input/output communications port known in the art.

The access node further comprises processing circuitry arranged to control operation of the access node. In particular, the processing circuitry 73 is configured to cause the access node to to receive a first or second radio link measurement reports over corresponding first or second mutually different radio link reporting mechanisms, wherein the first radio link measurement report comprises an initial target and wherein a handover target link is determined based on the second radio link measurement report. The processing circuitry is further configured to cause the access node to initiate a handover procedure to the initial target link or the handover target link.

According to an aspect of the disclosure, the processing circuitry comprises a processor 73a and a memory 73b. The processor 73a may be any suitable type of computation unit or circuit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry.

The memory 73*b* may be configured to store information received about configured estimation gaps The memory 73*b* may further be configured to store received or transmitted data and/or executable program instructions. The memory 73*b* may be any suitable type of computer readable memory and may be of volatile and/or non-volatile type.

Figure 8:
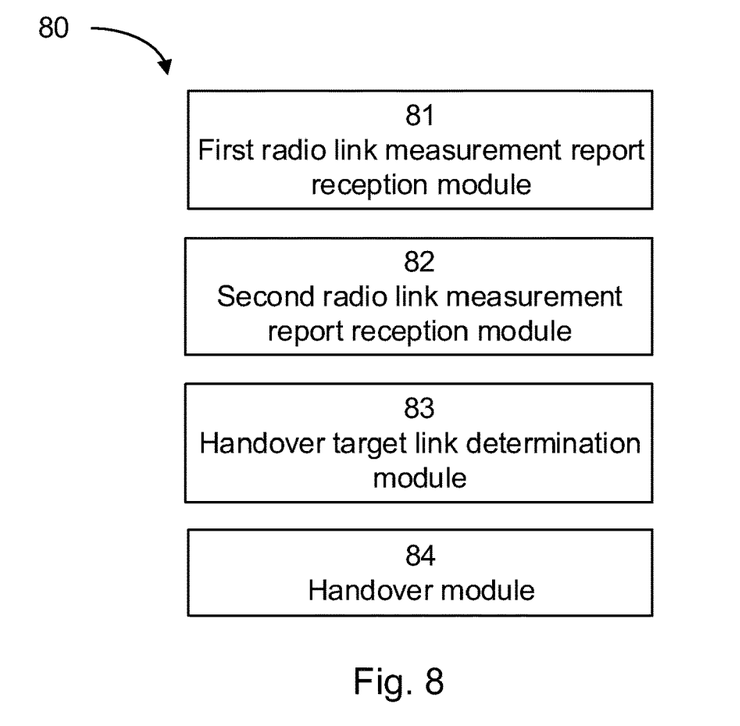
FIG. 8 illustrates an example node configuration for an access node.

FIG. 8 illustrates an embodiment of an access node 80 configured for performing wireless device assisted handover from a source node to a target node. The access node 80 comprises a first radio link measurement reception module 81 configured to receive a first radio link measurement report comprising an initial target link for the wireless device, wherein the first radio link measurement report is received through a first radio link reporting mechanism, a second radio link measurement reception module 82 configured to determine a handover target link based on the second radio link measurement report, and a handover module 83 configured to perform handover of the wireless device to the initial target link or the handover target link.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of source nodes, target nodes, corresponding methods, and computer program products. It should be appreciated that the example embodiments presented herein may be practiced in combination with each other.

The invention claimed is:

1. A method, for use in a wireless device, for performing wireless device assisted handover from a source access node to a target access node, the method comprising the wireless device:
    performing one or more mobility measurements for corresponding one or more candidate radio links, wherein performing the one or more mobility measurements comprises measuring downlink reference signals for the corresponding candidate radio links;
    selecting, from the one or more candidate radio links, an initial target link based on the performed one or more mobility measurements;
    transmitting a first radio link measurement report, based on the one or more mobility measurements, identifying the initial target link using an Uplink Synchronization Sequence (USS) based reporting mechanism to a target access node providing the initial target link;
    transmitting a second radio link measurement report, for the one or more candidate radio links and based on the same one or more mobility measurements, to the source access node using a Radio Resource Control (RRC) reporting mechanism different from the Uplink Synchronization Sequence (USS) based reporting mechanism; and
    initiating, based on a reception status of a handover from the source access node, wireless device connection over a handover target link indicated in a handover command from the source access node or over the initial target link, wherein initiating the wireless device connection comprises:
        when the handover command is received from the source access node after transmitting the first radio link measurement report, initiating the wireless connection over the handover target link indicated by the handover command rather than the initial target link; and
        when the handover command is not received from the source access node within a predetermined period of time, initiating the wireless device connection over the initial target link and switching to a handover target link received from the target access node.

2. The method of claim 1, wherein the performing one or more mobility measurements further comprises: deriving downlink synchronization settings from downlink reference signals; and storing the derived synchronization settings for the candidate radio links.

3. A wireless device configured to perform wireless device assisted handover from a source access node to a target access node, the wireless device comprising:
    radio circuitry configured for transmission and reception of radio signals;
    processing circuitry configured to, using the radio circuitry, cause the wireless device to:
        perform one or more mobility measurements for corresponding one or more candidate radio links, wherein performing the one or more mobility measurements comprises measuring downlink reference signals for the corresponding candidate radio links;
        select, from the one or more candidate radio links, an initial target link based on the performed one or more mobility measurements;
        transmit a first radio link measurement report, based on the one or more mobility measurements, identifying the initial target link using an Uplink Synchronization Sequence (USS) based reporting mechanism to a target access node providing the initial target link;
        transmit a second radio link measurement report, for the one or more candidate radio links and based on the same one or more mobility measurements, to the source access node using a Radio Resource Control (RRC) reporting mechanism different from the Uplink Synchronization Sequence (USS) based reporting mechanism; and
    initiate, based on a reception status of a handover command from the source access node, communication over a handover target link indicated in a handover command from the source access node or over the initial target link, wherein initiating the wireless device connection comprises:

when the handover command is received from the source access node after transmitting the first radio link measurement report, initiating the wireless connection over the handover target link indicated by the handover command rather than the initial target link; and when the handover command is not received from the source access node within a predetermine period of time, initiating the wireless device connection over the initial target link and switching to a handover target link received from the target access node.

4. A method, for use in target access node of a wireless network, for performing wireless device assisted handover from a source access node to the target access node, the method comprising:

receiving a first radio link measurement report using an Uplink Synchronization Sequence (USS) based reporting mechanism; and initiating, based on a reception status of a handover command from the source access node, a handover procedure to the initial target link or a handover target link indicated by the handover command, wherein:

when the handover command is received from the source access node after receiving the first radio link measurement report, initiating the handover procedure to the handover target link indicated by the handover command rather than the initial target link; and when the handover command is not received from the source access node within a predetermined period of time, initiating the handover procedure to the initial target link and switching to a handover target link received from the target access node.

5. The method of claim 4, further comprising transmitting configuration for measurement reporting to the wireless device.

6. A target access node configured for performing wireless device assisted handover from a source access node to the target access node, the target access node comprising:

radio circuitry arranged for transmission and reception of radio signals;

communications circuitry for transmission and reception of inter node communications signals;

processing circuitry configured to, using the radio circuitry, cause the target access node to:

receive a first radio link measurement report using an Uplink Synchronization Sequence (USS) based reporting mechanism, wherein the first radio link measurement report comprises an initial target link; and initiate, based on a reception status of a handover command from the source access node, a handover procedure to the initial target link or the handover target link indicated by the handover command, wherein:

when the handover command is received from the source access node after receiving the first radio link measurement report, initiating the handover procedure to the handover target link indicated by the handover command rather than the initial target link; and when the handover command is not received from the source access node within a predetermined period of time, initiating the handover procedure to the initial target link and switching to a handover target link received from the target access node.

* * * * *